UNITED STATES PATENT OFFICE.

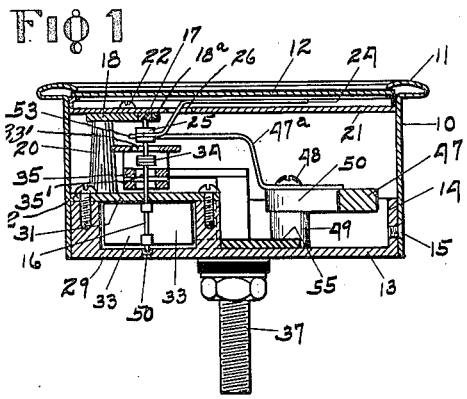

JOHN L. AXEN, OF OAK PARK, ILLINOIS, ASSIGNOR TO NATIONAL GAUGE & EQUIPMENT COMPANY, OF LA CROSSE, WISCONSIN, A CORPORATION OF WISCONSIN.

METHOD OF ASSEMBLING ELECTRICAL MEASURING INSTRUMENTS.

1,419,099. Specification of Letters Patent. Patented June 6, 1922.

Original application filed June 12, 1919, Serial No. 303,783. Divided and this application filed April 19, 1920. Serial No. 374,823.

*To all whom it may concern:*

Be it known that I, JOHN L. AXEN, a citizen of the United States, residing at Oak Park, in the county of Cook and State of Illinois, have invented certain new and useful Improvements in Methods of Assembling Electrical Measuring Instruments, of which the following is a specification.

My invention relates to the method of assembling the parts of an electrical measuring instrument, it particularly relating to the method of inserting and adjusting a bearing for the spindle of such instrument in a manner to permit the parts to be more readily assembled and adjusted; this application being a division of my application Ser. No. 303,783, filed June 12th, 1919, now Patent No, 1,342,840, dated June 8th, 1920.

The object of my invention is to provide a more simple and effective method of inserting and adjusting a bearing for the indicating needle staff of a measuring instrument, which also facilitates the assembling of the parts in a complete device.

In the accompanying drawings:—

Fig. 1 is a sectional view of an instrument embodying my improved method, the section being on the line 1—1 of Fig. 2.

Fig. 2 is a front elevation with the dial, its glass cover and retaining cap for the same removed.

Fig. 3 is an enlarged view of a portion of the base member of the casing as shown in Fig. 1, together with a portion of the pointer staff and lower bearing for the same.

Fig. 4 is a view similar to Fig. 3 with the pointer shaft and its bearing removed.

Fig. 5 is an enlarged section of the bearing for the lower end of the indicator staff.

Fig. 6 is a view of the apparatus employed in carrying out my improved method, the view being a section on the line 6—6 of Fig. 7, the operating parts on the instrument base being omitted.

Fig. 7 is also a view of the same apparatus, the same being a side view.

Fig. 8 is an end view of the apparatus.

Referring to the drawings, the instrument to which my improved method has been applied is constructed as follows: A casing is provided consisting of a cylindrical side wall 10, a base portion 13, preferably of soft metal having a flange 14, the casing being secured to the flange by screws 15. The upper edge of the casing has a flange 11, the opening in the casing being closed by a glass 12. An indicating pointer shaft 16 has its upper ends journaled in a bearing 17, carried at the end of a finger 18$^a$, integrally formed with and projecting centrally from a bar 18, which bar is secured by screws 19 to posts 20 which are integrally formed with the base 13. The staff has secured thereto as at 25 a needle or pointer 24 which projects through the arcuate opening of the dial 21, which dial is secured by the screws 22 to wings on the respective ends of the cross bar 18. The lower end of the pointer shaft is carried by a bearing to be hereinafter described, the peculiar method of insertion of the same forming one of the features of my invention. The staff has attached thereto fan blades 33, each of which is located in a fan-shaped chamber 30 closed at the top by a removable cover 31 secured in position by the screws 32, the staff extending between the adjoining apexes of the chambers.

Connected to the staff is an elongated armature 34 of magnetic material, which is influenced by a current carrying coil consisting of a flat strip of metal indicated in a general way by the numeral 35. The coil terminals being secured to the posts 36 and 37. The flat strip of metal comprising the coil extends about the armature, the coil consisting of three layers which are formed with aligned perforations as indicated at 35' to permit the passage therethrough of the staff 16, the perforation in the upper layer of the coil being elongated to also permit the passage therethrough of the elongated armature 34.

A permanent magnet 47 is bent on an arch to conform to the curvature of the periphery of the base and is secured at its opposite end by screws 48 upon posts 49 preferably formed integral with the bottom wall of the base, the magnet being mounted at the side of the base opposite to the armature 34 and coil 35. From the poles of the magnet there are extended therein strips 47$^a$ of cast iron or similar permeable material of low magnetic retentiveness, their ends being connected directly to the magnet 47 by means of the magnet mounting screws 48.

These strips extend from the poles of the magnet upwardly and away from the poles in a plane a short distance above the upper core 35 of the coil; the extreme ends of the strips being bent inwardly toward the staff so as to lie above the armature 34 at opposite sides of the staff As before stated, one of the features of my invention is the method of inserting the lower bearing for the staff 16; this bearing is in the nature of a cylindrical disk 50, one end being cupped out as at 51 to form a seat for the pointed ends of the staff. The base is punched from the inside with an opening 52 to receive the bearing, the opening being of a size so that the bearing will have a tight fit therein, the bearing being also inserted from the inside of the base. There is shown in Figs. 6, 7 and 8 one form of apparatus which may be employed in carrying out my method. After the operating parts have been assembled upon the base, the base is placed in an opening 60$^a$ of a block 60, the walls of the opening being provided with a shoulder 63 against which the base rests. The block is mounted upon a supporting base portion 61 and has at one side thereof a projecting boss 62 and at the opposite side thereof a projection 68 which has an open ended slot 68$^a$. Hinged to the boss 62 by the pivot screw 65 is a bar 64, a washer 66 being preferably inserted between the head of the screw and the bar. The bar is provided with a threaded opening 64$^a$ to receive the threaded portion 57 of a tool 58, having at its extreme end a reduced portion 59. When the bar 64 is swung to the position shown in the drawings with its free end resting in the slotted portion of the projection 68, the reduced portion 59 of the tool will be brought in line with the bearing 50 so that by turning the tool in the threaded opening of the bar the reduced portion 59 will bear against the bearing 50, and the bearing can be adjusted to the proper degree. The walls of the opening 60$^a$ beyond the shoulder are formed with two recesses 70 to accommodate the posts 20, which also prevents the base 13 from turning. After this operation the burrs about the edge of the opening which have resulted from the punching operation are pressed in against the bearing, as indicated in Fig. 3, by any suitable tool. This method furnishes a means for imparting a very fine adjustment to the bearing, the fit of the bearing in the opening in the base being sufficiently tight to hold the bearing in its adjusted position.

In assembling the parts, the fan blades 33 are placed within the chambers, the coils secured in position by fastening the terminals thereof to the posts 36 and 37, the staff with the armature 34 and pointer 20 secured thereto, then being inserted through the aligned apertures of the coil with the lower ends of the staff projected through the curled ends of the fan blades with a tight fit so as to frictionally bind the fans to the staff, and the bar carrying the bearing 17 is then secured in position with the respective ends of the staff located in that bearing and also the base bearing, after which the base bearing is adjusted in the manner before described.

Having thus described my invention, I claim:—

1. The method of providing bearings for a spindle, or the like, consisting in inserting a bearing in a plain cylindrical opening in a bearing carrying support, placing the spindle in position with one end thereof coincident with said inserted bearing, placing in position a bearing at the other end of said spindle, and finally adjusting the spindle in said bearings by pressing said inserted bearing to its proper position against the adjacent end of said spindle by the thrusting action of a tool.

2. The method of adjusting and securing a bearing in an opening formed in a bearing support by a punching operation which consists in inserting a plain cylindrical bearing in said opening, adjusting said bearing by forcing the bearing to its adjusted position by a pressing action, and pressing the burs of metal caused by the punching operation into said opening against said bearing.

3. The method of adjusting and securing a bearing consisting in providing a metal support with a punched opening, inserting a plain cylindrical bearing member in said opening, adjusting said bearing member by the thrusting action of a tool by causing the end of said tool to abut the bearing so as to force the same to its adjusted position, and afterwards pressing the burrs of metal caused by the pushing action into said opening against said bearing.

4. The method of providing bearings for a staff, spindle or the like, consisting in providing a fixed bearing for one end thereof, providing a metal support with an opening at the other end thereof, inserting a plain cylindrical bearing member into said opening with a tight fit, and adjusting said bearing member to the adjacent end of said staff by the thrusting action of a tool by causing the ends of said tool to abut the bearing so as to press the same in said opening against the adjacent end of said staff for the purpose of positioning said staff properly with respect to both of said bearings.

In testimony whereof, I have hereunto set my hand this 12th day of April, 1920.

JOHN L. AXEN.

Witnesses:
BYRON C. THORPE,
AUGUST F. SOBOTKA, Sr.